(12) United States Patent
Ji et al.

(10) Patent No.: US 11,057,309 B2
(45) Date of Patent: *Jul. 6, 2021

(54) MANAGEMENT METHOD, MANAGEMENT UNIT, AND SYSTEM

(71) Applicant: HUAWEI TECHNOLOGIES CO., LTD., Guangdong (CN)

(72) Inventors: Li Ji, Berkshire (GB); Ruiyue Xu, Shanghai (CN); Yan Li, Shanghai (CN); Xiaoqian Jia, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,546

(22) Filed: Aug. 27, 2019

(65) Prior Publication Data

US 2019/0386925 A1  Dec. 19, 2019

Related U.S. Application Data

(63) Continuation of application No. PCT/CN2017/074950, filed on Feb. 27, 2017.

(51) Int. Cl.
*H04L 12/857* (2013.01)
*H04L 12/24* (2006.01)
*H04W 72/04* (2009.01)

(52) U.S. Cl.
CPC ...... *H04L 47/2491* (2013.01); *H04L 41/5003* (2013.01); *H04W 72/048* (2013.01); *H04W 72/0493* (2013.01)

(58) Field of Classification Search
CPC .......... H04L 47/2491; H04L 41/5003
See application file for complete search history.

(56) References Cited

U.S. PATENT DOCUMENTS

| 7,415,003 B1 | 8/2008 | Ogura et al. |
| 2007/0116011 A1 | 5/2007 | Lim et al. |

(Continued)

FOREIGN PATENT DOCUMENTS

| CN | 101052207 A | 10/2007 |
| CN | 101283557 A | 10/2008 |

(Continued)

OTHER PUBLICATIONS

PCT International Search Report and Written Opinion in International Application No. PCT/CN2017/074,950, dated Sep. 19, 2017, 19 pages (With English Translation).

(Continued)

*Primary Examiner* — Deepa Belur
(74) *Attorney, Agent, or Firm* — Fish & Richardson P.C.

(57) ABSTRACT

Embodiments of the present disclosure provide a management method, and a management device and a system that are based on the method. The method includes: sending, by a second management device, an update request to a first management device, where the update request is used to request the first management device to update requirement information of a subnet managed by the first management device; and then, determining, by the first management device, that the subnet can satisfy the update request, or determining that the subnet cannot satisfy the update request. In the solutions in the embodiments of the present disclosure, the second management device can request the first management device to update the requirement information of the subnet managed by the first management device, thereby preventing a management fault of an entire network slice when a subnet managed by the second management device cannot satisfy a preset requirement.

10 Claims, 8 Drawing Sheets

(56) References Cited

U.S. PATENT DOCUMENTS

| | | | | |
|---|---|---|---|---|
| 2009/0279444 A1* | 11/2009 | Ravindran | | H04L 41/5038 370/252 |
| 2016/0254984 A1* | 9/2016 | Tekalp | | H04L 45/02 709/242 |
| 2018/0123943 A1* | 5/2018 | Lee | | H04L 45/28 |
| 2019/0349792 A1 | 11/2019 | Xu et al. | | |
| 2020/0252322 A1* | 8/2020 | Houyou | | H04L 47/785 |

FOREIGN PATENT DOCUMENTS

| | | | | |
|---|---|---|---|---|
| CN | 102904806 A | 1/2013 | | |
| CN | 106060900 A | 10/2016 | | |
| CN | 106209419 A | 12/2016 | | |
| CN | 106302229 A | 1/2017 | | |
| CN | 106341832 A | 1/2017 | | |
| CN | 110226308 A | 9/2019 | | |
| EP | 0772319 B1 | 3/2005 | | |
| EP | 1335528 B1 * | 11/2011 | | H04W 48/16 |
| EP | 3565182 A1 | 11/2019 | | |
| KR | 101268440 B1 | 5/2013 | | |

OTHER PUBLICATIONS

Extended European Search Report issued in European Application No. 17897412.7 dated Feb. 5, 2020, 7 pages.

3GPP TR 28.801 V0.3.0 (Nov. 2016), "3rd Generation Partnership Project;Technical Specification Group Services and System Aspects; Telecommunication management; Study on management and orchestration of network slicing for next generation network (Release 14)," Nov. 2016, 24 pages.

Ericsson, "Use case and requirements for modify network slice subnet instance," 3GPP TSG SA WG5 (Telecom Management) Meeting #111 Bis, S5A-170171; Munich, Germany, Feb. 13-17, 2017, 5 pages.

Huawei, "Modify use case and requirements for monitoring performance of network slice instance," 3GPP TSG SA WG5 (Telecom Management) Meeting #111Bis, S5A-170173; Munich, Germany, Feb. 13-17, 2017, 3 pages.

Huawei, "Add potential solution for creation of network slice instance," 3GPP TSG SA WG5 (Telecom Management) Meeting #111, S5-171353; Porto, Portugal, Jan. 16-20, 2017, 2 pages.

Office Action issued in Chinese Application No. 201780087430.3 dated Apr. 24, 2020, 16 pages (with English translation).

Office Action issued in Indian Application No. 201937034175 dated Feb. 11, 2021, 5 pages.

Huawei, "Adding network slicing management related function blocks," 3GPP TSG SA WG5 (Telecom Management) Meeting #111Bis, S5A-170111, Munich, Germany, Feb. 13-17, 2017, 2 pages.

Office Action issued in Chinese Application No. 201780087430.3 dated Apr. 30, 2021, 6 pages.

* cited by examiner

MANAGEMENT METHOD, MANAGEMENT UNIT, AND SYSTEM

CROSS-REFERENCE TO RELATED APPLICATIONS

This application is a continuation of International Application No. PCT/CN2017/074950, filed on Feb. 27, 2017, the disclosure of which is hereby incorporated by reference in its entirety.

TECHNICAL FIELD

The present disclosure relates to the field of communications technologies, and in particular, to a management method, a management unit, and a system.

BACKGROUND

A concept of network slicing is introduced when a future mobile communications system is studied. A network slice may be understood as an on-demand network. A physical network may be logically divided into a plurality of network slices, and different network slices may be used to carry different services. For example, an electric power company needs to provide a smart meter service, and this service can be implemented by using a network slice connecting a series of machine-to-machine (M2M) devices.

In an existing network slice management process, one network slice may include a plurality of subnets, and different subnets are required to support some requirements of the network slice. However, for a subnet, due to a network status change or another reason, during operation of the network slice, the subnet may fail to continue satisfying a preset requirement. As a result, a management fault of the entire network slice may occur.

SUMMARY

Embodiments of the present disclosure describe a management method, a management unit, and a system, to prevent a management fault of an entire network slice when a subnet cannot satisfy a preset requirement.

According to one aspect, an embodiment of the present disclosure provides a management method. The method includes: sending, by a second management unit, an update request to a first management unit, where the update request is used to request the first management unit to update requirement information of a subnet managed by the first management unit; and determining, by the first management unit, that the subnet can satisfy the update request, or determining that the subnet cannot satisfy the update request. In the solution in this embodiment of the present disclosure, the second management unit can request the first management unit to update requirement information of a first subnet, thereby preventing a management fault of an entire network slice when a second subnet cannot satisfy a preset requirement.

In a possible design, the update request carries first indication information, where the first indication information is an update value used by the second management unit to instruct the first management unit to update the requirement information of the subnet.

In a possible implementation, if the first management unit determines that the subnet can satisfy the update request, the first management unit may further modify the subnet based on the first indication information.

In a possible design, the first management unit may further send an update response to the second management unit, where the update response carries update information of the requirement information of the subnet.

In a possible implementation, the update information may include one or both of an update result and second indication information. The update result is used to indicate an update value that can be supported by the first management unit and that is used to update the requirement information of the subnet. The second indication information is used to indicate that the subnet can satisfy the update request, or the second indication information is used to indicate that the subnet cannot satisfy the update request.

In a possible design, the requirement information of the subnet may include at least one of a latency, a throughput, a report success ratio, a command success ratio, reliability, a capacity, and coverage.

According to another aspect, an embodiment of the present disclosure provides another management method. The method includes: determining, by a first management unit, requirement information of a second subnet based on requirement information of a first subnet, where the first subnet is a subnet managed by the first management unit, the second subnet is a subnet managed by a second management unit, and the first subnet and the second subnet are subnets included in a network slice; and sending, by the first management unit, the requirement information of the second subnet to the second management unit. In the solution in this embodiment of the present disclosure, the network slice includes the first subnet and the second subnet, and the first management unit may determine the requirement information of the second subnet based on the requirement information of the first subnet, and send the requirement information of the second subnet to the second management unit. Therefore, the first management unit can adjust the requirement information of the subnet managed by the first management unit and the requirement information of the subnet managed by the second management unit, thereby preventing a management fault of the entire network slice when the first subnet cannot satisfy a preset requirement.

In a possible design, before determining the requirement information of the second subnet based on the requirement information of the first subnet, the first management unit may further receive capability information of the second subnet from the second management unit. In this case, the first management unit may determine the requirement information of the second subnet based on the requirement information of the first subnet and the capability information of the second subnet.

In a possible implementation, before receiving the capability information of the second subnet from the second management unit, the first management unit may further send a query request to the second management unit, where the query request is used to request the capability information of the second subnet.

In a possible design, before determining the requirement information of the second subnet based on the requirement information of the first subnet, the first management unit may further send warning information to a third management unit, where the warning information is used to indicate that the first management unit starts a coordination process between the requirement information of the first subnet and the requirement information of the second subnet.

In a possible design, the first management unit may further send a notification message to a third management unit, where the notification message is used to notify the third management unit that the first management unit has completed a coordination process between the requirement information of the first subnet and the requirement information of the second subnet.

In a possible design, the requirement information of the first subnet or the requirement information of the second subnet may include at least one of a latency, a throughput, a report success ratio, a command success ratio, reliability, a capacity, and coverage.

In the solutions described in the foregoing two aspects, the first management unit and the second management unit may be different domain manager units, for example, may be same-domain manager units, or may be different-domain manager units. The third management unit may be a cross-domain manager unit.

According to still another aspect, an embodiment of the present disclosure provides a first management unit. The first management unit has functions for implementing actions of the first management unit in the foregoing method designs. The functions may be implemented by hardware, or may be implemented by hardware executing corresponding software. The hardware or software includes one or more modules corresponding to the foregoing functions.

In a possible design, the first management unit includes a processor, where the processor is configured to support the first management unit in implementing a corresponding function in the foregoing methods. Further, the first management unit may further include a communications interface, where the communications interface is configured to support the first management unit in communicating with a second management unit, a third management unit, or another unit. Further, the first management unit may further include a memory, where the memory is configured to couple with the processor, and store a program instruction and data necessary for the first management unit.

According to yet another aspect, an embodiment of the present disclosure provides a second management unit. The second management unit has functions for implementing actions of the second management unit in the foregoing method designs. The functions may be implemented by hardware, or may be implemented by hardware executing corresponding software. The hardware or software includes one or more modules corresponding to the foregoing functions.

In a possible design, the second management unit includes a processor, where the processor is configured to support the second management unit in implementing a corresponding function in the foregoing methods. Further, the second management unit may further include a communications interface, where the communications interface is configured to support the second management unit in communicating with a first management unit or another unit. Further, the second management unit may further include a memory, where the memory is configured to couple with the processor, and store a program instruction and data necessary for the second management unit.

According to still yet another aspect, an embodiment of the present disclosure provides a third management unit. The third management unit has functions for implementing actions of the third management unit in the foregoing method designs. The functions may be implemented by hardware, or may be implemented by hardware executing corresponding software. The hardware or software includes one or more modules corresponding to the foregoing functions.

In a possible design, the third management unit includes a processor, where the processor is configured to support the third management unit in implementing a corresponding function in the foregoing methods. Further, the third management unit may further include a communications interface, where the communications interface is configured to support the third management unit in communicating with a first management unit or another unit. Further, the third management unit may further include a memory, where the memory is configured to couple with the processor, and store a program instruction and data necessary for the third management unit.

According to a further aspect, an embodiment of the present disclosure provides a communications system, where the system includes the first management unit and the second management unit described in the foregoing aspects; or the system includes the first management unit, the second management unit, and the third management unit described in the foregoing aspects.

According to a still further aspect, an embodiment of the present disclosure provides a computer readable storage medium, where the computer readable storage medium stores an instruction, and when the instruction runs on a computer, the computer is enabled to perform the methods in the foregoing aspects.

According to a yet further aspect, an embodiment of the present disclosure provides a computer program product that includes an instruction, where when the instruction runs on a computer, the computer is enabled to perform the methods in the foregoing aspects.

Compared to the prior art, in the solutions in the embodiments of the present disclosure, the second management unit can request the first management unit to update the requirement information of the first subnet, thereby preventing a management fault of the entire network slice when the second subnet cannot satisfy a preset requirement.

DESCRIPTION OF EMBODIMENTS

The following describes the technical solutions in the embodiments of the present disclosure with reference to the accompanying drawings in the embodiments of the present disclosure.

A network architecture and a service scenario that are described in the embodiments of the present disclosure are used to describe the technical solutions in the embodiments of the present disclosure more clearly, and do not constitute limitations to the technical solutions provided in the embodiments of the present disclosure. A person of ordinary skill in the art may know that the technical solutions provided in the embodiments of the present disclosure are also applicable to similar technical problems as the network architecture evolves and a new service scenario appears.

Some possible application scenarios and network architectures to which the embodiments of the present disclosure are applicable are first described below with reference to FIG. 1 and FIG. 2.

Figure 1:
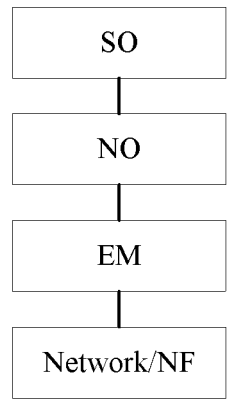
FIG. 1 is a schematic diagram of a possible application scenario according to an embodiment of the present disclosure.

FIG. 1 is a schematic diagram of a possible application scenario according to an embodiment of the present disclosure. In the application scenario shown in FIG. 1, at least a service orchestrator (SO) unit, a network orchestrator (NO) unit, an element manager (EM) unit, and a network unit/a network function (NF) unit are included. The following briefly describes the units shown in FIG. 1.

The SO unit may also be referred to as a service orchestration and management unit or a service management unit, and mainly includes the following functions: service lifecycle management (for example, instantiation, update, and deletion) based on a service request message; service aggregation; service management, for example, service fault, configuration, accounting, performance, security (FCAPS) management; mapping between a service and a network slice; and the like. A service may be a communication service entitled to a group of users within a specified service level agreement (SLA), for example, a mobile broadband (MBB) service, a voice service, or an Internet of Things (JOT) service (for example, a smart parking service or a smart meter reading service). For example, the SO unit may manage a service carried by a network slice.

The NO unit may also be referred to as a network orchestration and management unit or a network management unit, and mainly includes the following functions: network slice management, for example, network slice lifecycle management and network slice template management; mapping between a network slice and a network function; coordination between different types of network resources; coordination between network resources provided by different operators or different network providers, so that the network resources provided by different network providers can satisfy a requirement of a target service, for example, an SLA requirement, a key performance indicator (KPI) requirement, or a quality of service (QoS) requirement; unified orchestration for network devices provided by different providers; and provision of an external application programming interface (API), where the API is used to provide a network function for a third party for implementing cross-operator deployment.

The EM unit may also be referred to as a network function manager (NF-M) unit, and mainly includes the following functions: network element or network function lifecycle management (for example, instantiation, update, and deletion); network element or network function FCAPS management; and the like.

The network unit may include at least one of a core network unit, an access network unit, or a transport network unit. It should be noted that the network unit may be replaced by a network function unit, or the network unit may also have a function of a network function unit. The "Network/NF" unit shown in FIG. 1 is a unit having a function of a network unit and/or a function of a network function unit.

It should be noted that the SO unit or the NO unit may be deployed in an operations support system (OSS), or the SO unit or the NO unit may be deployed independent of an OSS. The OSS may be understood as a support system oriented to device and network maintenance, and is responsible for single-vendor network management and multi-vendor network management.

It can be understood that descriptions of the functions of the units are merely some examples, and each unit may still have another function. This is not limited in the embodiments of the present disclosure.

For ease of description, a unit may be represented by an English abbreviation of the unit below. For example, the SO unit may be represented by SO, and other units are represented in a similar way. Details are not described below.

Figure 2:
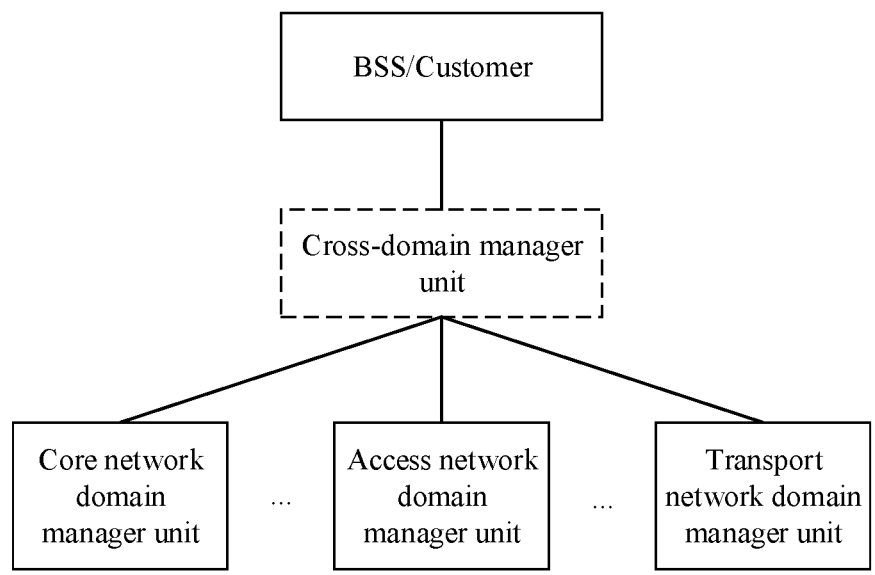
FIG. 2 is a schematic diagram of a possible network architecture according to an embodiment of the present disclosure.

Based on the foregoing application scenario, FIG. 2 shows a possible network architecture according to an embodiment of the present disclosure. As shown in FIG. 2, the network architecture includes a business support system (BSS), a core network domain manager (CN-DM) unit, and an access network domain manager (AN-DM) unit, a transport network domain manager (TN-DM) unit, and the like. For example, the access network domain manager unit may be a radio access network domain manager (RAN-DM) unit. The CN-DM, the AN-DM, and the TN-DM are interconnected. Optionally, the network architecture may further include a cross domain manager (CDM) unit. When the network architecture does not include the CDM, the BSS is connected to the CN-DM, the AN-DM, and the TN-DM; when the network architecture includes the CDM, the CDM is connected to the BSS, and the CDM is further connected to the CN-DM, the AN-DM, and the TN-DM.

The following briefly describes the BSS, the CDM, the CN-DM, the AN-DM, and the TN-DM.

The BSS is responsible for performing service-related management (for example, service operation, accounting, and customer relationship management) and providing a service for a terminal. In the network architecture shown in FIG. 2, the BSS may be alternatively replaced by a customer, or the BSS may also have a function of a customer. Functions of the customer include: performing service management and providing a corresponding service for the terminal. In FIG. 2, the "BSS/Customer" represents a unit having a function of the BSS and/or a function of the customer.

The CDM may also be referred to as a cross-domain slice manager (CDSM) unit, a cross-domain orchestration unit, or a network slice management function (NSSF) unit, and has a network slice (NSL) management function and/or an NSL orchestration function. For example, the CDM may include some or all of the following functions: NSL management such as network slice lifecycle management, network slice template management, network slice fault management, network slice performance management, and network slice configuration management; mapping between an NSL and a subnet and mapping between an NSL and a network function; coordination between network resources or service level agreement (SLA) information provided by different sub-domains (for example, a core network domain, an access network domain, or a transport network domain); and unified orchestration for subnet slices or network functions provided by all sub-domains, where the unified orchestration enables the subnet slices or the network functions provided by all the sub-domains to satisfy a requirement of a target service (for example, an SLA requirement, a key performance indicator (KPI) requirement, or a quality of service (QoS) requirement).

The network slice, also referred to as an end-to-end (E2E) network slice, may include at least a core network (CN) part, an access network (Access Network, AN) part, and a transport network (TN) part; or the network slice may include any two of a CN part, an AN part, or a TN part; or the network slice may be a network slice of a CN part, a network slice of an AN part, or a network slice of a TN part. The access network may be a radio access network (RAN). It can be understood that the network slice described in the embodiments of the present disclosure may also have another implementation. This is not limited in the embodiments of the present disclosure.

The CN-DM may also be referred to as a core network domain slice manager (CN-DSM) unit, and has a subnet management function of a core network domain network slice and/or a subnet orchestration function of the core network domain network slice. For example, the CN-DM may include some or all of the following functions: subnet management of the core network domain network slice, for example, subnet lifecycle management (including creation, update, and deletion), subnet fault management, subnet performance management, and subnet configuration management; management of a service in the core network domain, for example, service lifecycle management, service fault management, service performance management, and service configuration management; and coordination between network resources in the core network domain for unified orchestration.

The AN-DM may also be referred to as an access network domain slice manager (AN-DSM) unit, and has a subnet management function of an access network domain network slice and/or a subnet orchestration function of the access network domain network slice. For example, the AN-DM may include some or all of the following functions: subnet management of the access network domain network slice, for example, subnet lifecycle management (including creation, update, and deletion), subnet fault management, subnet performance management, and subnet configuration management; management of a service in the access network domain, for example, service lifecycle management, service fault management, service performance management, and service configuration management; and coordination between network resources in the access network domain for unified orchestration.

The TN-DM may also be referred to as a transport network domain slice manager (TN-DSM) unit, and has a subnet management function of a transport network domain network slice and/or a subnet orchestration function of the transport network domain network slice. For example, the TN-DM may include some or all of the following functions: subnet management of the transport network domain network slice, for example, subnet lifecycle management (including creation, update, and deletion), subnet fault management, subnet performance management, and subnet configuration management; management of a service in the transport network domain, for example, service lifecycle management, service fault management, service performance management, and service configuration management; and coordination between network resources in the transport network domain for unified orchestration.

When the network architecture shown in FIG. 2 does not include the CDM, the CN-DM, the AN-DM, and the TN-DM may all be deployed in the SO, may all be deployed in the NO, or may all be deployed in the EM. When the network architecture shown in FIG. 2 includes the CDM, the CDM, the CN-DM, the AN-DM, and the TN-DM may all be deployed in the SO or may all be deployed in the NO; or the CDM may be deployed in the NO, and the CN-DM, the AN-DM, and the TN-DM may all be deployed in the EM; or the CDM may be deployed in the SO, and the CN-DM, the AN-DM, and the TN-DM may all be deployed in the NO.

It should be noted that the CN-DM, the AN-DM, and the TN-DM may be collectively referred to as a domain manager (DM) unit, a domain slice manager (Domain Slice Manager, DSM) unit, or a network slice subnet management function (NSSMF) unit. Furthermore, the domain manager unit may be a domain manager unit that manages a single subnet; or may be a domain manager unit that manages hybrid subnets. In the latter case, the subnets managed by the domain manager unit may include any two or all of the CN, the AN, or the TN.

Based on the foregoing common aspects in the embodiments of the present disclosure, the following further describes the embodiments of the present disclosure in detail.

In an existing network slice management process, one network slice may include a plurality of subnets, and different subnets are required to support some requirements of the network slice. However, for a subnet, due to a network status change or another reason, during operation of the network slice, the subnet may fail to continue satisfying a preset requirement. As a result, a management fault of the entire network slice may occur.

In view of this, the embodiments of the present disclosure provide a management method, and a management unit and a system that are based on the method. The method includes: sending, by a second management unit, an update request to a first management unit, where the update request is used to request the first management unit to update requirement information of a subnet managed by the first management unit; and determining, by the first management unit, that the subnet can satisfy the update request, or determining that the subnet cannot satisfy the update request. In the solutions in the embodiments of the present disclosure, the second management unit can request the first management unit to update requirement information of a first subnet, thereby preventing a management fault of an entire network slice when a second subnet cannot satisfy a preset requirement.

It should be noted that in this specification, if the following concepts are described, reference may be made to the following descriptions.

Requirement information of a network slice is necessary information for determining the network slice. For example, the requirement information of the network slice may include some or all of a network slice type (for example, enhanced mobile broadband (eMBB), massive machine type communication (mMTC), or ultra-reliable and low-latency communication (URLLC)), a service SLA requirement, a network KPI, and the like. The service SLA requirement or the network KPI may include at least one of a latency, a report success ratio, a command success ratio, coverage, a capacity, reliability, and a throughput. The report success ratio may be a proportion of successful uplink packet transmission; the command success ratio may be a proportion of successful downlink packet transmission; the coverage may be a terminal distribution area; and the capacity may be a quantity of terminals that can be supported.

Requirement information of a subnet (for example, the requirement information of the first subnet or requirement information of the second subnet) is necessary information for determining the subnet. For example, the requirement information of the subnet may include some or all of a service SLA requirement, a network KPI, and the like. The service SLA requirement or the network KPI may include at least one of a latency, a throughput, a report success ratio, a command success ratio, reliability, a capacity, and coverage. The subnet may also be referred to as a subnetwork.

Capability information of a subnet is a feature of the subnet or a subnet feature that can be provided by a management unit of the subnet. For example, the capability information of the subnet may include a type of the subnet, a function of the subnet, an area supported by the subnet, a capacity supported by the subnet, a service or network parameter (for example, an SLA) supported by the subnet, a range of requirement information of the subnet, or the like. The SLA of the subnet may include a latency requirement and/or a throughput requirement that can be satisfied by the subnet.

Figure 3:
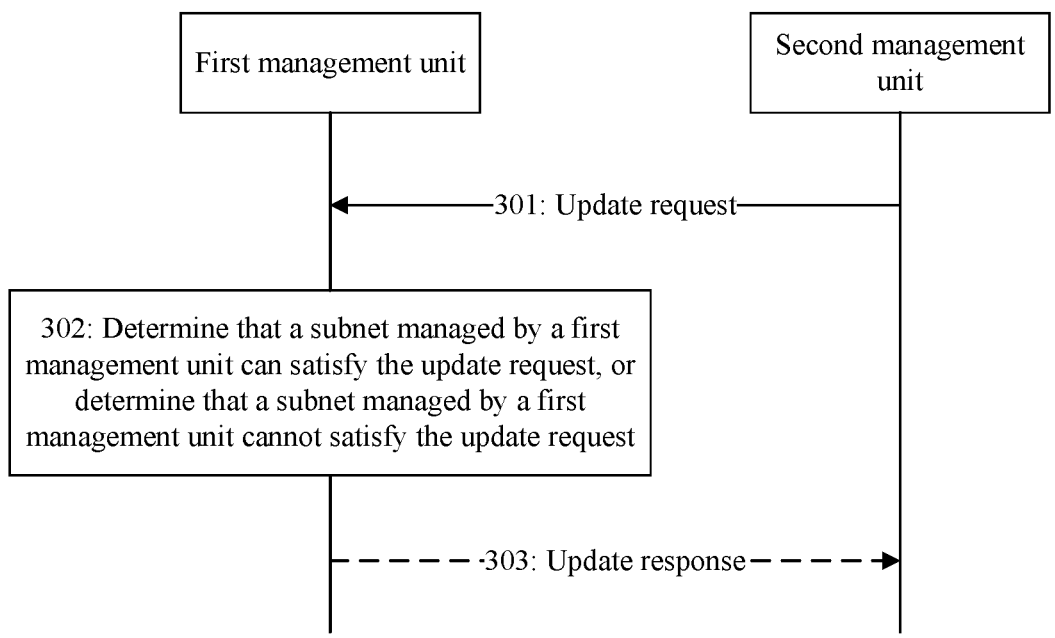
FIG. 3 is a communication schematic diagram of a management method according to an embodiment of the present disclosure.

With reference to FIG. 3, the following describes the solution provided in an embodiment of the present disclosure. A method shown in FIG. 3 is described by using the network architecture shown in FIG. 2 as an example. In addition, for description of the requirement information of the subnet, if mentioned, reference may be made to the foregoing detailed description, and details are not described herein again. The method shown in FIG. 3 includes a part 301 and a part 302. Optionally, the method may further include a part 303.

In part 301, a second management unit sends an update request to a first management unit, where the update request is used to request the first management unit to update requirement information of a subnet managed by the first management unit.

In an example, the update request may carry first indication information, where the first indication information is an update value used by the second management unit to instruct the first management unit to update the requirement information of the subnet.

In an example, before sending the update request to the first management unit, the second management unit may further determine the update request first. In a possible implementation, the second management unit may first obtain capability information of a subnet managed by the second management unit, and determine the update request based on the capability information of the subnet. For example, the second management unit determines, based on the capability information of the subnet, that the subnet cannot satisfy a preset requirement, and therefore determines the update request.

In an example, the requirement information of the subnet may include at least one of a latency, a throughput, a report success ratio, a command success ratio, reliability, a capacity, and coverage.

In part 302, the first management unit determines that the subnet can satisfy the update request, or determines that the subnet cannot satisfy the update request.

For example, the first management unit may determine, based on the capability information of the subnet, that the subnet can satisfy the update request, or that the subnet cannot satisfy the update request.

In an example, the first management unit determines that the subnet can satisfy the update request. In a possible implementation, if the update request carries the first indication information, the first management unit may further modify the subnet based on the first indication information.

In part 303, the first management unit sends an update response to the second management unit.

The update response carries update information of the requirement information of the subnet.

In an example, the update information may include one or both of an update result and second indication information. The update result is used to indicate an update value that can be supported by the first management unit and that is used to update the requirement information of the subnet. The second indication information is used to indicate that the subnet can satisfy the update request, or the second indication information is used to indicate that the subnet cannot satisfy the update request.

Figure 4:
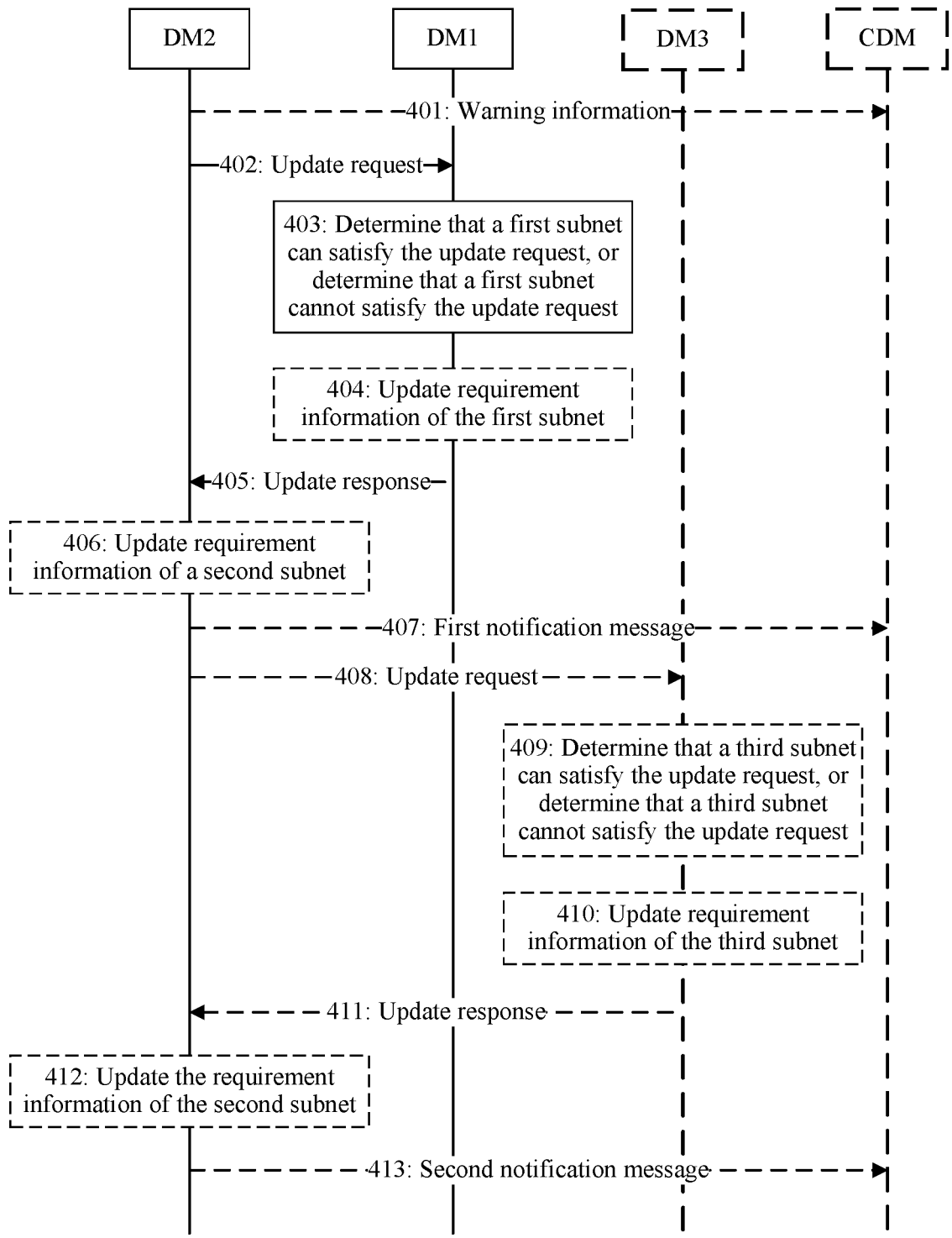
FIG. 4 is a communication schematic diagram of another management method according to an embodiment of the present disclosure.

With reference to FIG. 4, based on the method shown in FIG. 3, the following further describes the solution in an embodiment of the present disclosure by using an example in which the first management unit and the second management unit are different domain manager units (for example, the first management unit is a DM1, and the second management unit is a DM2). When a third management unit is used, a CDM is used as an example of the third management unit for description. In addition, for description of the requirement information of the subnet and the capability information of the subnet, if mentioned, reference may be made to the foregoing detailed description, and details are not described herein again.

FIG. 4 shows a management method in a scenario in which negotiation is performed between different domain manager units according to an embodiment of the present disclosure. The method shown in FIG. 4 may relate to only a DM1 and a DM2. Optionally, the method may further relate to one or both of a DM3 and a CDM, where the DM3 is a domain manager unit other than the DM1 and the DM2. For ease of description, a subnet managed by the DM1 is referred to as a first subnet, a subnet managed by the DM2 is referred to as a second subnet, and a subnet managed by the DM3 is referred to as a third subnet. The method shown in FIG. 4 includes part 402 and part 403. Optionally, the method shown in FIG. 4 may further include all or some processes of part 401 and part 404 to part 413.

In part 401, the DM2 sends warning information to the CDM, where the warning information is used to indicate that DM1 starts an inter-domain coordination process.

In an example, if the second subnet cannot satisfy a preset requirement due to a network status change or another reason, the DM2 sends the warning information to the CDM, to start the inter-domain coordination process. For example, when the method shown in FIG. 4 does not relate to the DM3, the inter-domain coordination process may be a coordination process between requirement information of the second subnet and requirement information of the first subnet; or when the method shown in FIG. 4 relates to the DM3, the inter-domain coordination process may be a coordination process between requirement information of the second subnet, requirement information of the first subnet, and requirement information of the third subnet.

In an example, requirement information of each subnet is an SLA of the subnet, and the SLA may be, for example, a latency requirement or a throughput requirement. An SLA of a subnet may be described as a sub-SLA. For example, an SLA of the first subnet may be described as a sub-SLA 1, an SLA of the second subnet may be described as a sub-SLA 2, and so on.

In a possible implementation, a network slice serves a throughput-sensitive service, the foregoing SLA is a throughput requirement, and a preset throughput requirement that needs to be satisfied by the first subnet is 20 G. However, due to a network status change or another reason, a throughput that can be currently satisfied by the first subnet is lower than 20 G. Therefore, the DM1 triggers the inter-domain coordination process and sends the warning information to the CDM.

In part 402, the DM2 sends an update request to the DM1, where the update request is used to request the DM1 to update the requirement information of the first subnet.

In an example, a maximum throughput that can be currently satisfied by the second subnet is 15 G, that is, the maximum throughput that can be currently satisfied by the second subnet is 5 G lower than the preset throughput of 20 G. In this case, the DM2 sends an update request to the DM1 to request the DM1 to update the sub SLA 1, so that the first subnet further supports 5 G in addition to the preset throughput of the first subnet.

In an example, the update request may carry first indication information, where the first indication information is an update value used by the DM2 to instruct the DM1 to update the requirement information of the first subnet. For example, the update value may be a throughput of 5 G.

In part 403, the DM1 determines that the first subnet can satisfy the update request, or determines that the first subnet cannot satisfy the update request.

For example, the DM1 may determine, based on capability information of the first subnet, that the first subnet can satisfy the update request, or that the first subnet cannot satisfy the update request. For example, the capability information of the first subnet may be a throughput requirement that can be currently satisfied by the first subnet.

In part 404, the DM1 updates the requirement information of the first subnet.

In an example, if the DM1 determines that the first subnet can satisfy the update request in part 403, the DM1 then performs part 404. In a possible implementation, the DM1 may modify the first subnet based on the first indication information. For example, the DM1 updates the sub-SLA 1 so that a throughput of the sub-SLA 1 is 5 G higher than the preset throughput of the first subnet.

In another example, if the DM1 determines that the first subnet cannot satisfy the update request in part 403, the DM1 may then perform part 404, or may not perform part 404.

In a possible implementation, although the DM1 cannot satisfy the update request, the sub-SLA 1 may be updated so that a throughput of the sub-SLA 1 is 2 G higher than the preset throughput of the first subnet. In another possible implementation, the DM1 cannot satisfy the update request or update the sub-SLA 1.

In part 405, the DM1 sends an update response to the DM2.

In an example, the update response carries update information of the requirement information of the first subnet. For example, the update information may include one or both of an update result and second indication information. The update result is an update value that can be supported by the DM1 and that is used to update the requirement information of the first subnet, and the second indication information is used to indicate that the first subnet can satisfy the update request or the second indication information is used to indicate that the first subnet cannot satisfy the update request. If the first subnet can satisfy the update request, the second indication information may be referred to as a positive indication; or if the first subnet cannot satisfy the update request, the second indication information may be referred to as a negative indication.

In a possible implementation, if the DM1 can satisfy the update request, the update response may carry one or both of the positive indication and the update result. For example, the positive indication may be represented by an indication value 1, and the update result may be a throughput of 5 G, or the update result may be a throughput supported by the first subnet after an update is performed, that is, a sum of the preset throughput of the first subnet and the throughput of 5 G.

In another possible implementation, if the DM1 cannot satisfy the update request, the update response may carry one or both of the negative indication and the update result. For example, the negative indication may be represented by an indication value 0, and the update result may be a throughput of 0 G or a throughput of 2 G, or the update result may be the preset throughput of the first subnet or a throughput supported by the first subnet after an update is performed. Herein, the throughput supported by the first subnet after the update is performed is a sum of the preset throughput of the first subnet and the throughput of 2 G.

It should be noted that if the update response carries one or both of the positive indication and the throughput of 5 G, or if the update response carries one or both of the positive indication and the sum of the preset throughput of the first subnet and the throughput of 5 G, the update response may be referred to as a positive response; or if the update response carries neither the positive indication nor the throughput of 5 G or the sum of the preset throughput of the first subnet and the throughput of 5 G, the update response may be referred to as a negative response.

In part 406, the DM2 updates the requirement information of the second subnet.

In an example, if the update response is the positive response, the DM2 may update the sub-SLA 2 from the preset 20 G to 15 G.

In another example, if the update response is the negative response, the DM2 may perform part 406 or may not perform part 406. In a possible implementation, if the update response carries the negative indication but does not carry the update result, the DM2 does not perform part 406; or if the update result carried in the update response is the throughput of 0 G or the preset throughput of the first subnet, the DM2 does not perform part 406. In another possible implementation, if the update result carried in the update response is the throughput of 2 G or the sum of the preset throughput of the first subnet and the throughput of 2 G, the DM2 may update the sub-SLA 2 from the preset 20 G to 18 G.

In part 407, the DM2 sends a first notification message to the CDM.

The first notification message is used to notify the CDM that the inter-domain coordination process is completed. In this case, the first notification message may be referred to as a positive notification message. Alternatively, the first notification message is used to notify the CDM that the inter-domain coordination process fails. In this case, the first notification message may be referred to as a negative notification message.

In an example, if the DM2 receives the positive response in part 405, the DM2 performs part 407 to send the positive notification message to the CDM in part 407. In this case, part 408 to part 413 of the method shown in FIG. 4 are not performed.

In another example, if the DM2 receives the negative response in part 405, the DM2 may perform part 407 to send the negative notification message to the CDM in part 407. In this case, part 408 to part 413 of the method shown in FIG. 4 are not performed.

In still another example, if the DM2 receives the negative response in part 405, the DM2 may perform part 408 to part 413 instead of part 407.

Part 408 to part 413 are similar to part 402 to part 406. For implementation processes of part 408 to part 413, reference may be made to the implementation processes of the foregoing part 402 to part 406, and details are not described herein again.

It should be noted that if an update response received by the DM2 in part 411 is the positive response, the DM2 may send a positive update notification to the CDM in part 413 to notify the CDM that the inter-domain coordination process is completed. Alternatively, if an update response received by the DM2 in part 411 is the negative response, the DM2 may send a negative update notification to the CDM in part 413 to notify the CDM that the inter-domain coordination process fails. Alternatively, if an update response received by the DM2 in part 411 is the negative response, the DM2 may further send an update request to a DM other than the DM1 and the DM3, and perform implementation processes similar to part 402 to part 406 until the inter-domain coordination process is completed.

An embodiment of the present disclosure further provides a management method, and a management unit and a system that are based on the method. The method includes: determining, by a first management unit, requirement information of a second subnet based on requirement information of a first subnet, where the first subnet is a subnet managed by the first management unit, the second subnet is a subnet managed by a second management unit, and the first subnet and the second subnet are subnets included in a network slice; and sending, by the first management unit, the requirement information of the second subnet to the second management unit. In the solution in this embodiment of the present disclosure, the network slice includes the first subnet and the second subnet, and the first management unit may determine the requirement information of the second subnet based on the requirement information of the first subnet, and send the requirement information of the second subnet to the second management unit. Therefore, the first management unit can adjust the requirement information of the subnet managed by the first management unit and the requirement information of the subnet managed by the second management unit, thereby preventing a management fault of the entire network slice when the first subnet cannot satisfy a preset requirement.

Figure 5:
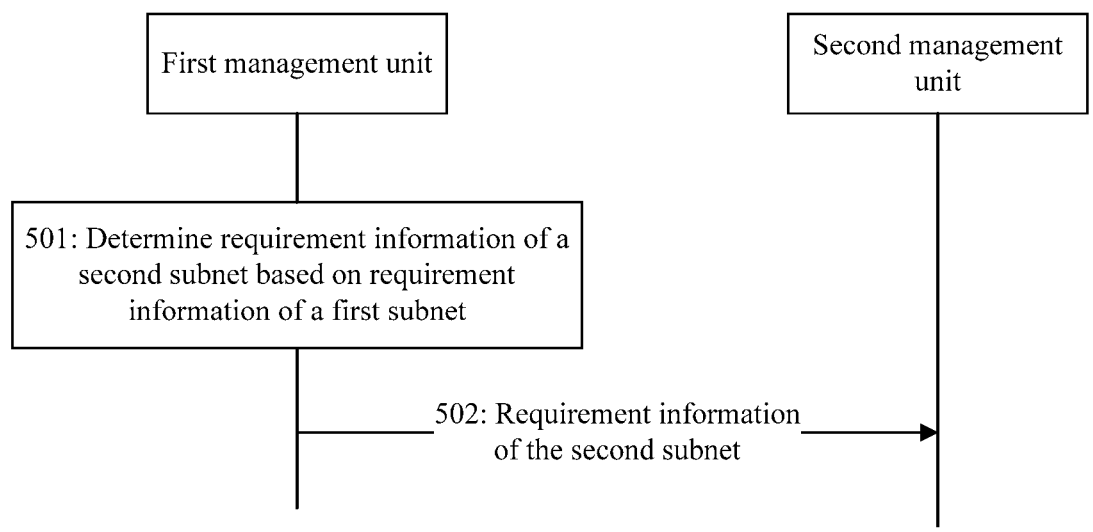
FIG. 5 is a communication schematic diagram of still another management method according to an embodiment of the present disclosure.

With reference to FIG. 5, the following describes the solution provided in an embodiment of the present disclosure. A method shown in FIG. 5 is described by using the network architecture shown in FIG. 2 as an example. The method shown in FIG. 5 includes part 501 and part 502.

In part 501, a first management unit determines requirement information of a second subnet based on requirement information of a first subnet.

The first subnet is a subnet managed by the first management unit, the second subnet is a subnet managed by the second management unit, and the first subnet and the second subnet are subnets included in a network slice.

In an example, before determining the requirement information of the second subnet based on the requirement information of the first subnet, the first management unit may further receive capability information of the second subnet from the second management unit. In this case, the first management unit may determine the requirement information of the second subnet based on the requirement information of the first subnet and the capability information of the second subnet.

In a possible implementation, before receiving the capability information of the second subnet from the second management unit, the first management unit may further send a query request to the second management unit, where the query request is used to request the capability information of the second subnet.

In an example, before determining the requirement information of the second subnet based on the requirement information of the first subnet, the first management unit may further send warning information to a third management unit, where the warning information is used to indicate that the first management unit starts a coordination process between the requirement information of the first subnet and the requirement information of the second subnet.

In an example, requirement information of a subnet may include at least one of a latency, a throughput, a report success ratio, a command success ratio, reliability, a capacity, and coverage.

In part 502, the first management unit sends the requirement information of the second subnet to the second management unit.

In an example, the first management unit may further send a notification message to the third management unit, where the notification message is used to notify the third management unit that the first management unit has completed the coordination process between the requirement information of the first subnet and the requirement information of the second subnet.

In the solution illustrated in FIG. 5, the first management unit may be a domain manager unit; the second management unit may be a domain manager unit other than the first management unit; and the third management unit may be a cross-domain manager unit. It should be noted that the first management unit and the second management unit may be same-domain manager units. For example, the first management unit and the second management unit are different core network domain manager units, different access network domain manager units, or different transport network domain manager units. Alternatively, the first management unit and the second management unit may be different-domain manager units. For example, the first management unit is one of a core network domain manager unit, an access network domain manager unit, and a transport network domain manager unit, and the second management unit is a domain manager unit, other than the first management unit, in the three domain manager units. This is not limited in this embodiment of the present disclosure.

Figure 6:
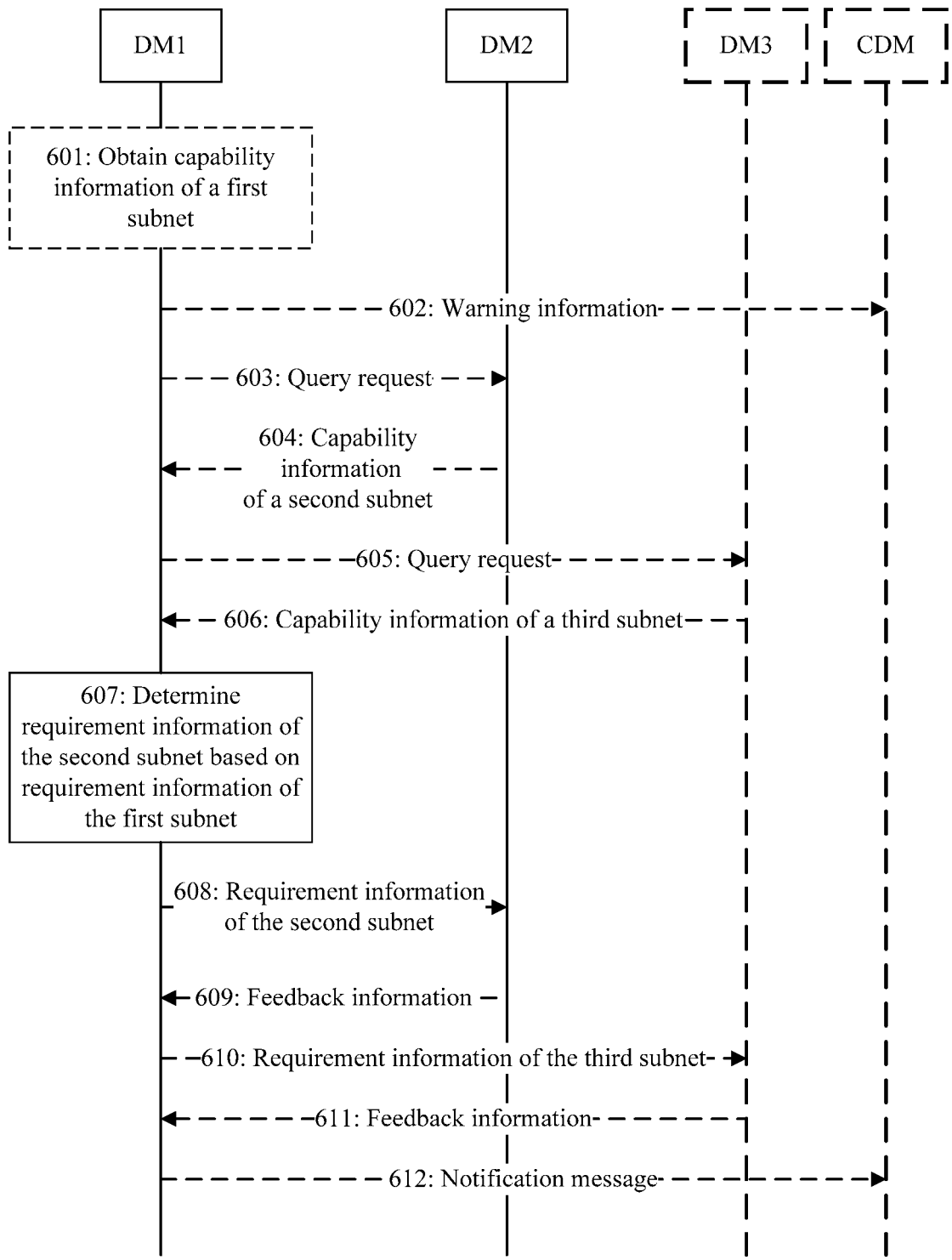
FIG. 6 is a communication schematic diagram of yet another management method according to an embodiment of the present disclosure.

With reference to FIG. 6, based on the method shown in FIG. 5, the following further describes the solution provided in an embodiment of the present disclosure by using an example in which the first management unit and the second management unit are different domain manager units (for example, the first management unit is a DM1, and the second management unit is a DM2). When a third management unit is used, a CDM is used as an example of the third management unit for description. In a method shown in FIG. 6, for content same as or similar to that of the method shown in FIG. 5, reference may be made to the detailed description in FIG. 5, and details are not described herein again. In addition, for description of requirement information of a subnet and capability information of the subnet, if mentioned, reference may be made to the foregoing detailed description, and details are not described herein again.

FIG. 6 shows another management method in a scenario in which negotiation is performed between different domain manager units according to an embodiment of the present disclosure. The method shown in FIG. 6 may relate to only a DM1 and a DM2. Optionally, the method may further relate to one or both of a DM3 and a CDM, where the DM3 is a domain manager unit other than the DM1 and the DM2. Correspondingly, a subnet managed by the DM1 is a first subnet, a subnet managed by the DM2 is a second subnet, and a subnet managed by the DM3 is a third subnet. The method shown in FIG. 6 includes part 607 and part 608. Optionally, the method shown in FIG. 6 may further include all or some processes of part 601 to part 606 and part 609 to part 612.

In part 601, the DM 1 obtains capability information of the first subnet.

In an example, the DM1 may obtain the capability information of the first subnet once or periodically, to determine whether the first subnet can satisfy a preset requirement.

In part 602, the DM1 sends warning information to the CDM, where the warning information is used to indicate that DM1 starts an inter-domain coordination process.

In an example, if the first subnet cannot satisfy the preset requirement due to a network status change or another reason, the DM1 sends the warning information to the CDM, to start the inter-domain coordination process. For example, when the method shown in FIG. 6 does not relate to the DM3, the inter-domain coordination process may be a coordination process between requirement information of the first subnet and requirement information of the second subnet; or when the method shown in FIG. 6 relates to the DM3, the inter-domain coordination process may be a coordination process between requirement information of the first subnet, requirement information of the second subnet, and requirement information of the third subnet. The first subnet, the second subnet, and the third subnet are subnets included in one network slice.

In part 603, the DM1 sends a query request to the DM2, where the query request is used to request capability information of the second subnet.

In part 604, the DM 2 sends the capability information of the second subnet to the DM1.

When the method shown in FIG. 6 does not relate to the DM3, part 607 is performed after part 604 is performed; or when the method shown in FIG. 6 relates to the DM3, part 605 is performed after part 604 is performed.

In part 605, the DM1 sends a query request to the DM3, where the query request is used to request capability information of the third subnet.

In part 606, the DM3 sends the capability information of the third subnet to the DM1.

In part 607, the DM1 determines the requirement information of the second subnet based on the requirement information of the first subnet.

In an example, when the method shown in FIG. 6 does not relate to the DM3, the DM1 determines the requirement information of the first subnet and the requirement information of the second subnet based on requirement information of the network slice. For example, when part 602 to part 604 are performed, the DM1 may determine the requirement information of the second subnet based on the requirement information of the first subnet and the capability information of the second subnet.

In another example, when the method shown in FIG. 6 relates to the DM3, the DM1 determines the requirement information of the second subnet and the requirement information of the third subnet based on the requirement information of the first subnet. For example, when part 602 to part 606 are performed, the DM1 may determine the requirement information of the second subnet and the requirement information of the third subnet based on the requirement information of the first subnet, the capability information of the second subnet, and the capability information of the third subnet.

In part 608, the DM1 sends the requirement information of the second subnet to the DM2.

In part 609, the DM2 sends feedback information to the DM1.

The feedback information herein is used to indicate whether the DM2 performs corresponding adjustment based on the requirement information of the second subnet. For example, if the DM2 performs corresponding adjustment based on the requirement information of the second subnet, the feedback information may be referred to as success feedback information; or if the DM2 does not perform corresponding adjustment based on the requirement information of the second subnet, the feedback information may be referred to as failure feedback information.

When the method shown in FIG. 6 does not relate to the DM3, part 612 is performed after part 609 is performed; or when the method shown in FIG. 6 relates to the DM3, part 610 is performed after part 609 is performed.

In part 610, the DM1 sends the requirement information of the third subnet to the DM3.

In part 611, the DM3 sends feedback information to the DM1.

The feedback information herein is used to indicate whether the DM3 performs corresponding adjustment based on the requirement information of the third subnet. For example, if the DM3 performs corresponding adjustment based on the requirement information of the third subnet, the feedback information may be referred to as success feedback information; or if the DM3 does not perform corresponding adjustment based on the requirement information of the third subnet, the feedback information may be referred to as failure feedback information.

In part 612, the DM1 sends a notification message to the CDM to notify the CDM that the inter-domain coordination process is completed or that the inter-domain coordination process fails.

In an example, when the method shown in FIG. 6 does not relate to the DM3, if the feedback information sent by the DM2 to the DM1 is the success feedback information, the notification message sent by the DM1 to the CDM is used to notify the CDM that the inter-domain coordination process is completed, that is, the coordination process between the requirement information of the first subnet and the requirement information of the second subnet is completed; or if the feedback information sent by the DM2 to the DM1 is the failure feedback information, the notification message sent by the DM1 to the CDM is used to notify the CDM that the inter-domain coordination process fails. Optionally, in the latter case, the notification message may carry a failure cause of the inter-domain coordination process.

In another example, when the method shown in FIG. 6 relates to the DM3, if both the feedback information sent by the DM2 to the DM1 and the feedback information sent by the DM3 to the DM1 are the success feedback information, the notification message sent by the DM1 to the CDM is used to notify the CDM that the inter-domain coordination process is completed, that is, the coordination process between the requirement information of the first subnet, the requirement information of the second subnet, and the requirement information of the third subnet is completed; or if both or one of the feedback information sent by the DM2 to the DM1 and the feedback information sent by the DM3 to the DM1 are the failure feedback information, the notification message sent by the DM1 to the CDM is used to notify the CDM that the inter-domain coordination process fails. Optionally, in the latter case, the notification message may carry a failure cause of the inter-domain coordination process.

It should be noted that in the part 612, if the notification message is used to notify the CDM that the inter-domain coordination process fails, the part 602 to the part 612 may be re-performed, or the part 607 to the part 612 may be re-performed until the notification message in the part 612 is used to notify the CDM that the inter-domain coordination process is completed. For example, when capability information of each subnet changes rapidly, the part 602 to the part 612 may be re-performed; or when capability information of each subnet is relatively stable, the part 607 to the part 612 may be re-performed.

Figure 7:
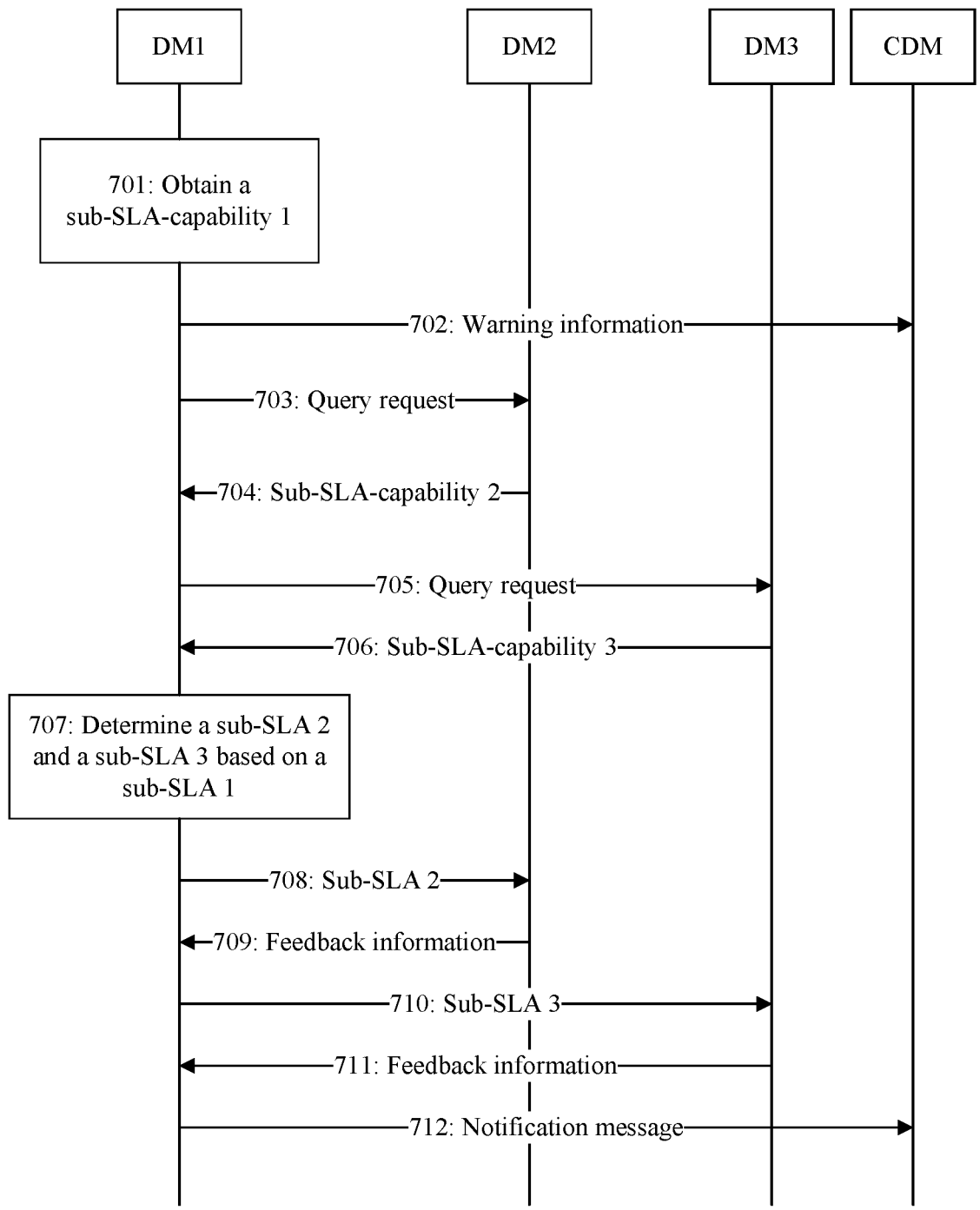
FIG. 7 is a communication schematic diagram of still yet another management method according to an embodiment of the present disclosure.

With reference to FIG. 7, the following further describes the solution in an embodiment of the present disclosure by using an example in which the requirement information of the network slice is an SLA of the network slice, requirement information of each subnet is an SLA of the subnet, and capability information of each subnet is an SLA that can be supported by the subnet. In a method shown in FIG. 7, the SLA of the network slice may be described as a total-SLA or an E2E-SLA, and an SLA of a subnet may be described as a sub-SLA (for example, an SLA of a first subnet may be described as a sub-SLA 1, an SLA of a second subnet may be described as a sub-SLA 2, and an SLA of a third subnet may be described as a sub-SLA 3), and capability information of a subnet may be described as a sub-SLA-capability (for example, capability information of the first subnet may be described as a sub-SLA-capability 1, capability information of the second subnet may be described as a sub-SLA-capability 2, and capability information of the third subnet may be described as a sub-SLA-capability 3).

In part 701, a DM1 obtains the sub-SLA-capability 1.

In an example, the sub-SLA-capability 1 is a latency that can be satisfied by the first subnet, and the latency that can be satisfied by the first subnet is greater than 300 ms. However, a preset latency requirement that needs to be satisfied by the first subnet is 300 ms. In this case, the DM1 determines, based on the sub-SLA-capability 1, that the first subnet cannot satisfy a preset requirement.

In another example, the sub-SLA-capability 1 is a throughput that can be satisfied by the first subnet, and the throughput that can be satisfied by the first subnet is less than 20 G. However, a preset throughput requirement that needs to be satisfied by the first subnet is 20 G. In this case, the DM1 determines, based on the sub-SLA-capability 1, that the first subnet cannot satisfy a preset requirement.

In part 702, the DM1 sends warning information to a CDM, where the warning information is used to indicate that the DM1 starts an inter-domain coordination process.

In an example, the network slice serves a latency-sensitive service, and the SLA is a latency requirement. In this case, the total-SLA is 600 ms. The preset latency requirements that need to be satisfied by the first subnet, the second subnet, and the third subnet are 300 ms, 200 ms, and 100 ms, respectively. Due to a network status change or another reason, the first subnet cannot satisfy the preset 300 ms. Therefore, the DM1 triggers the inter-domain coordination process and sends the warning information to the CDM.

In another example, the network slice serves a throughput-sensitive service, and the SLA is a throughput requirement. In this case, the total-SLA is 55 G. The preset throughput requirements that need to be satisfied by the first subnet, the second subnet, and the third subnet are 20 G, 25 G, and 10 G, respectively. Due to a network status change or another reason, the first subnet cannot satisfy the preset 20 G. Therefore, the DM1 triggers the inter-domain coordination process and sends the warning information to the CDM.

In part 703, the DM1 sends a query request to the DM2 for requesting the sub-SLA-capability 2.

In an example, the sub-SLA-capability 2 is a latency that can be supported by the second subnet.

In another example, the sub-SLA-capability 2 is a throughput that can be supported by the second subnet.

In part 704, the DM2 sends the sub-SLA-capability 2 to the DM1.

In an example, the sub-SLA-capability 2 is 150 ms.

In another example, the sub-SLA-capability 2 is 30 G.

In part 705, the DM1 sends a query request to the DM3 for requesting the sub-SLA-capability 3.

In an example, the sub-SLA-capability 3 is a latency that can be supported by the third subnet. Alternatively, the sub-SLA-capability 3 may be a latency that can be additionally supported by the third subnet based on the preset requirement.

In another example, the sub-SLA-capability 3 is a throughput that can be supported by the third subnet. Alternatively, the sub-SLA-capability 3 may be a throughput that can be additionally supported by the third subnet based on the preset requirement.

In part 706, the DM3 sends the sub-SLA-capability 3 to the DM1.

In an example, the sub-SLA-capability 3 is 80 ms.

In another example, the sub-SLA-capability 3 is 15 G.

In part 707, the DM1 determines the sub-SLA 2 and the sub-SLA 3 based on the sub-SLA 1.

For example, the DM1 determines the sub-SLA 2 and the sub-SLA 3 based on the sub-SLA 1, the sub-SLA-capability 1, the sub-SLA-capability 2, and the sub-SLA-capability 3.

In an example, if the sub-SLA 1 is 350 ms, the DM1 determines that the sub-SLA 2 is 150 ms and the sub-SLA 3 is 100 ms.

In another example, if the sub-SLA 1 is 15 G, the DM1 determines that the sub-SLA 2 is 28 G and the sub-SLA 3 is 12 G.

In part 708, the DM1 sends the sub-SLA 2 to the DM2.

In part 709, the DM2 sends feedback information to the DM1, where the feedback information is success feedback information.

In part 710, the DM1 sends the sub-SLA 2 to the DM3.

In part 711, the DM3 sends feedback information to the DM1, where the feedback information is success feedback information.

In part 712, the DM1 sends a notification message to the CDM to notify a CDM1 that the inter-domain coordination process is completed.

The foregoing mainly describes the solutions provided in the embodiments of the present disclosure from a perspective of interaction between different management units. It can be understood that, to implement the foregoing functions, the first management unit, the second management unit, and the third management unit each include a corresponding hardware structure and/or a software module for implementing respective functions. With reference to units and algorithm steps of each example described in the embodiments disclosed in the present disclosure, the embodiments of the present disclosure may be implemented in a form of hardware or a combination of hardware and computer software. Whether a function is implemented by hardware or in a manner of driving hardware by a computer software depends on a particular application and a design constraint of the technical solution. A person skilled in the art may use different methods for each particular application to implement the described functions, but it should not be construed that the implementation goes beyond the scope of the technical solutions of the embodiments of the present disclosure.

In the embodiments of the present disclosure, function module division may be performed on the first management unit, the second management unit, the third management unit, and the like based on the foregoing method examples, for example, function modules may be divided based on functions, or two or more functions may be integrated into one processing module. The integrated module may be implemented in a form of hardware, or may be implemented in a form of a function module of software. It should be noted that, the module division in the embodiments of the present disclosure is an example and is merely logical function division. There may be another division manner in actual implementation.

Figure 8A:
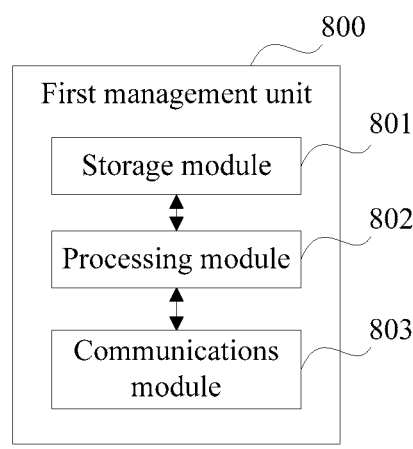
FIG. 8A is a schematic block diagram of a first management unit according to an embodiment of the present disclosure.

When an integrated module is used, FIG. 8A is a possible schematic block diagram of the first management unit in the embodiments of the present disclosure. The first management unit 800 includes a processing module 802 and a communications module 803. The processing module 802 is configured to control and manage actions of the first management unit. For example, the processing module 802 is configured to support the first management unit in performing the processes 302 and 303 in FIG. 3, the processes 403 to 405 in FIG. 4, the processes 501 and 502 in FIG. 5, the processes 601 to 603, 605, 607, 608, 610, and 612 in FIG. 6, the processes 701 to 703, 705, 707, 708, 710, and 712 in FIG. 7, and/or other processes for implementing the techniques described in this specification. The communications module 803 is configured to support the first management unit in communicating with a second management unit or a third management unit. The first management unit may further include a storage module 801, configured to store program code and data of the first management unit.

The processing module 802 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing module 802 can implement or execute various example logical blocks, modules, and circuits that are described with reference to the content disclosed in the present disclosure. The processor may be a combination for implementing a computing function, for example, a combination of one or more microprocessors or a combination of the DSP and a microprocessor. The communications module 1303 may be a communications interface, a transceiver, a transceiver circuit, or the like. The communications interface is a general name. During specific implementation, the communications interface may include a plurality of interfaces, for example, may include an interface between the first management unit and the second management unit or the third management unit and/or another interface. The storage module 801 may be a memory.

Figure 8B:
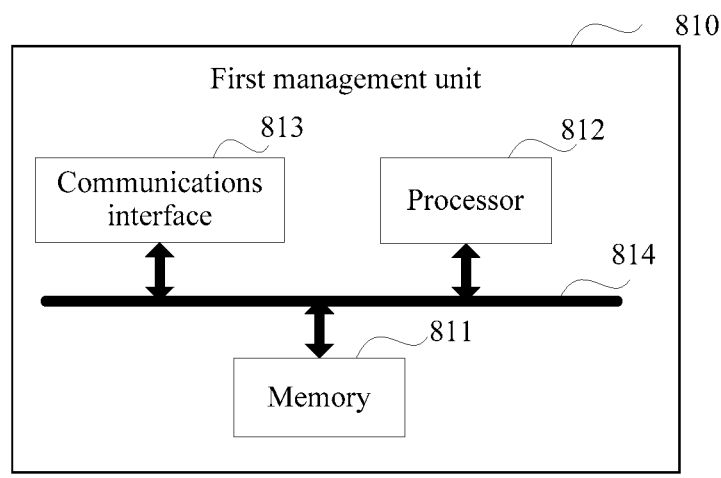
FIG. 8B is a schematic structural diagram of a first management unit according to an embodiment of the present disclosure.

When the processing module 802 is a processor, the communications module 803 is a communications interface, and the storage module 801 is a memory, the first management unit in this embodiment of the present disclosure may be a first management unit shown in FIG. 8B.

As shown in FIG. 8B, the first management unit 810 includes a processor 812, a communications interface 813, and a memory 811. Optionally, the first management unit 810 may further include a bus 814. The communications interface 813, the processor 812, and the memory 811 may be connected to each other by using the bus 814. The bus 814 may be a peripheral component interconnect (PCI) bus, an extended industry standard architecture (EISA) bus, or the like. The bus 814 may be classified into an address bus, a data bus, a control bus, and the like. For ease of representation, only one thick line is used to represent the bus in FIG. 8B, and this does not mean that there is only one bus or only one type of bus.

The first management unit shown in FIG. 8A and FIG. 8B may be the domain manager unit in FIG. 2, for example, a core network domain manager unit, an access network domain manager unit, or a transport network domain manager unit.

Figure 9A:
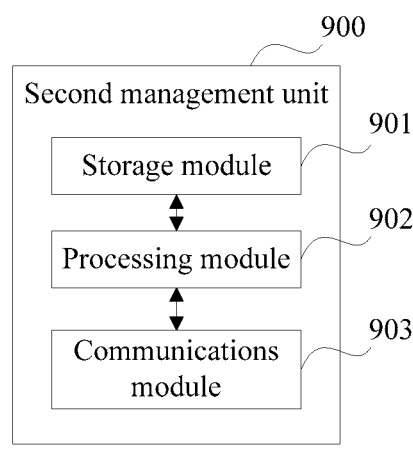
FIG. 9A is a schematic block diagram of a second management unit according to an embodiment of the present disclosure.

When an integrated unit is used, FIG. 9A is a possible schematic block diagram of the second management unit in the embodiments of the present disclosure. The second management unit 900 includes a processing module 902 and a communications module 903. The processing module 902 is configured to control and manage actions of the second management unit. For example, the processing module 902 is configured to support the second management unit in performing the process 301 in FIG. 3, the processes 401, 402, 406 to 408, 412, and 413 in FIG. 4, the processes 604 and 609 in FIG. 6, the processes 704 and 709 in FIG. 7, and/or other processes for implementing the techniques described in this specification. The communications module 903 is configured to support the second management unit in communicating with a first management unit. The second management unit may further include a storage module 901, configured to store program code and data of the second management unit.

The processing module 902 may be a processor or a controller, for example, may be a CPU, a general-purpose processor, a DSP, an ASIC, an FPGA, or another programmable logic device, a transistor logic device, a hardware component, or any combination thereof. The processing module 902 can implement or execute various example logical blocks, modules, and circuits that are described with reference to the content disclosed in the present disclosure. The processor may be a combination for implementing a computing function, for example, a combination of one or more microprocessors or a combination of the DSP and a microprocessor. The communications module 1303 may be a communications interface, a transceiver, a transceiver circuit, or the like. The communications interface is a general name. During specific implementation, the communications interface may include a plurality of interfaces, for example, may include an interface between the second management unit and the first management unit and/or another interface. The storage module 901 may be a memory.

Figure 9B:
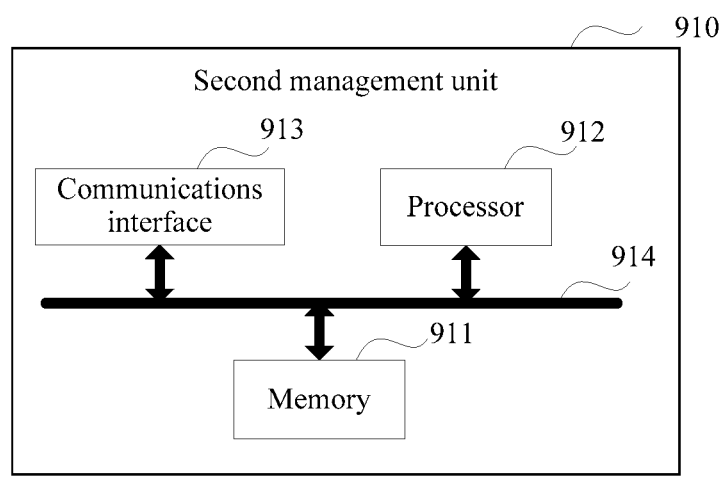
FIG. 9B is a schematic structural diagram of a second management unit according to an embodiment of the present disclosure.

When the processing module 902 is a processor, the communications module 903 is a communications interface, and the storage module 901 is a memory, the second management unit in this embodiment of the present disclosure may be a second management unit shown in FIG. 9B.

As shown in FIG. 9B, the second management unit 910 includes a processor 912, a communications interface 913, and a memory 911. Optionally, the second management unit 910 may further include a bus 914. The communications interface 913, the processor 912, and the memory 911 may be connected to each other by using the bus 914. The bus 914 may be a PCI bus, an EISA bus, or the like. The bus 914 may be classified into an address bus, a data bus, a control bus, and the like. For ease of representation, only one thick line is used to represent the bus in FIG. 9B, and this does not mean that there is only one bus or only one type of bus.

The second management unit shown in FIG. 9A and FIG. 9B may be the domain manager unit in FIG. 2, for example, a core network domain manager unit, an access network domain manager unit, or a transport network domain manager unit.

An embodiment of the present disclosure further provides a third management unit. A possible schematic block diagram of the third management unit is similar to FIG. 8A or FIG. 9A, and a possible schematic structural diagram of the third management unit is similar to FIG. 8B or FIG. 9B. For specific descriptions, reference may be made to the detailed descriptions in FIG. 8A to FIG. 9B, and details are not described herein again. The third management unit may implement the actions of the third management unit in the foregoing method embodiments, and/or other processes for implementing the techniques described in this specification. The third management unit provided in this embodiment of the present disclosure may be the cross-domain manager unit in FIG. 2.

Methods or algorithm steps described with reference to the content disclosed in the embodiments of the present disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a component of the processor. The processor and the storage medium may be located in an ASIC. In addition, the ASIC may be located in the first management unit, the second management unit, or the third management unit. Certainly, the processor and the storage medium may alternatively exist as discrete components in the first management unit, the second management unit, or the third management unit.

A person skilled in the art should be aware that, in one or more of the foregoing examples, the functions described in the embodiments of the present disclosure may be partially or all implemented by using hardware, software, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

The objectives, technical solutions, and beneficial effects of the embodiments of the present disclosure are further described in detail in the foregoing specific implementations. It should be understood that the foregoing descriptions are merely specific implementations of the embodiments of the present disclosure, but are not intended to limit the protection scope of the embodiments of the present disclosure. Any modification, equivalent replacement, or improvement made based on the technical solutions in the embodiments of the present disclosure shall fall within the protection scope of the embodiments of the present disclosure.

What is claimed is:

1. A management method, comprising:
   determining, by a first management device, requirement information of a second subnet based on requirement information of a first subnet, wherein the first subnet is a subnet managed by the first management device, the second subnet is a subnet managed by a second management device, and the first subnet and the second subnet are subnets comprised in a network slice, wherein both the requirement information of the first subnet and the requirement information of the second subnet comprise at least one of a latency, a throughput, a report success ratio, a command success ratio, reliability, a capacity, or coverage; and
   sending, by the first management device, the requirement information of the second subnet to the second management device.

2. The method according to claim 1, wherein before the determining, by a first management device, requirement information of a second subnet based on requirement information of a first subnet, the method further comprises:
   receiving, by the first management device, capability information of the second subnet from the second management device; and wherein
   the determining, by a first management device, requirement information of a second subnet based on requirement information of a first subnet comprises:
   determining, by the first management device, the requirement information of the second subnet based on the requirement information of the first subnet and the capability information of the second subnet.

3. The method according to claim 2, wherein before the receiving, by the first management device, capability information of the second subnet from the second management device, the method further comprises:

sending, by the first management device, a query request to the second management device, wherein the query request is used to request the capability information of the second subnet.

4. The method according to claim 1, wherein before the determining, by a first management device, requirement information of a second subnet based on requirement information of a first subnet, the method further comprises:
sending, by the first management device, warning information to a third management device, wherein the warning information is used to indicate that the first management device starts a coordination process between the requirement information of the first subnet and the requirement information of the second subnet.

5. The method according to claim 1, further comprising:
sending, by the first management device, a notification message to a third management device, wherein the notification message is used to notify the third management device that the first management device has completed a coordination process between the requirement information of the first subnet and the requirement information of the second subnet.

6. A first management device, comprising:
memory, configured to store computer executable program code; and
at least one processor, coupled to the memory, wherein the program code comprises instructions, and when the at least one processor executes the instructions, the instructions enable the first management device to perform the following operations:
determining requirement information of a second subnet based on requirement information of a first subnet, wherein the first subnet is a subnet managed by the first management device, the second subnet is a subnet managed by a second management device, and the first subnet and the second subnet are subnets comprised in a network slice, wherein both the requirement information of the first subnet and the requirement information of the second subnet comprise at least one of a latency, a throughput, a report success ratio, a command success ratio, reliability, a capacity, or coverage; and sending the requirement information of the second subnet to the second management device.

7. The first management device according to claim 6, wherein when the at least one processor executes the instructions, the instructions further enable the first management device to perform the following operations:
receiving capability information of the second subnet from the second management device; and wherein
the operation of determining requirement information of a second subnet comprises:
determining the requirement information of the second subnet based on the requirement information of the first subnet and the capability information of the second subnet.

8. The first management device according to claim 7, wherein when the at least one processor executes the instructions, the instructions further enable the first management device to perform the following operations:
sending a query request to the second management device to request the capability information of the second subnet.

9. The first management device according to claim 6, wherein when the at least one processor executes the instructions, the instructions further enable the first management device to perform the following operations:
before determining the requirement information of the second subnet based on the requirement information of the first subnet, sending warning information to a third management device to indicate that the first management device starts a coordination process between the requirement information of the first subnet and the requirement information of the second subnet.

10. The first management device according to claim 6, wherein when the at least one processor executes the instructions, the instructions further enable the first management device to perform the following operations:
sending a notification message to a third management device to notify the third management device that the first management device has completed a coordination process between the requirement information of the first subnet and the requirement information of the second subnet.

* * * * *